(12) United States Patent
Hung

(10) Patent No.: US 9,733,442 B2
(45) Date of Patent: Aug. 15, 2017

(54) OPTICAL COMMUNICATION APPARATUS

(71) Applicant: ScienBiziP Consulting (Shenzhen) Co., Ltd., Shenzhen (CN)

(72) Inventor: Yi Hung, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 528 days.

(21) Appl. No.: 14/252,963

(22) Filed: Apr. 15, 2014

(65) Prior Publication Data

US 2016/0299301 A1    Oct. 13, 2016

(30) Foreign Application Priority Data

Apr. 23, 2013 (TW) .............................. 102114297 A

(51) Int. Cl.
*G02B 6/42* (2006.01)

(52) U.S. Cl.
CPC ............ *G02B 6/428* (2013.01); *G02B 6/4214* (2013.01); *G02B 6/4231* (2013.01); *G02B 6/4246* (2013.01); *G02B 6/4206* (2013.01)

(58) Field of Classification Search
CPC .................................................. G02B 6/4246
See application file for complete search history.

(56) References Cited

U.S. PATENT DOCUMENTS

| | | | |
|---|---|---|---|
| 6,873,800 B1* | 3/2005 | Wei ...................... | G02B 6/4204 385/14 |
| 6,910,812 B2* | 6/2005 | Pommer .............. | G02B 6/4201 257/200 |
| 2007/0223865 A1* | 9/2007 | Lu ........................ | G02B 6/4292 385/90 |
| 2009/0003763 A1* | 1/2009 | Mohammed ........ | H01L 31/0203 385/14 |

FOREIGN PATENT DOCUMENTS

JP          5184708 B1     4/2013
TW       201310096 A1    3/2013

* cited by examiner

*Primary Examiner* — Sung Pak
*Assistant Examiner* — Hoang Tran
(74) *Attorney, Agent, or Firm* — Steven Reiss

(57) ABSTRACT

Optical communication apparatus includes a printed circuit board (PCB), a photoelectric unit electrically connected to the PCB, a supporting member positioned on the PCB, a coupler supported on the supporting member, and an optical fiber unit. The coupler optically couples the photoelectric unit to the optical fiber unit. The supporting member defines a through stepped hole having a larger first hole and a smaller second hole. The supporting member includes a step portion between the first hole and the second hole. The second hole is closer to the PCB than the first hole. The supporting member defines a number of positioning holes, and the coupler comprises a number of positioning poles corresponding to the positioning holes. The coupler is connected to the supporting member by inserting the positioning poles into the corresponding positioning holes.

13 Claims, 4 Drawing Sheets

OPTICAL COMMUNICATION APPARATUS

FIELD

The present disclosure relates to an optical communication apparatus.

BACKGROUND

Optical communication apparatuses include a coupler and a photoelectric unit. The coupler optically couples an optical fiber unit to the photoelectric unit. To ensure an optical transmission efficiency of the optical communication apparatus, the coupler needs to be accurately aligned with the photoelectric unit.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
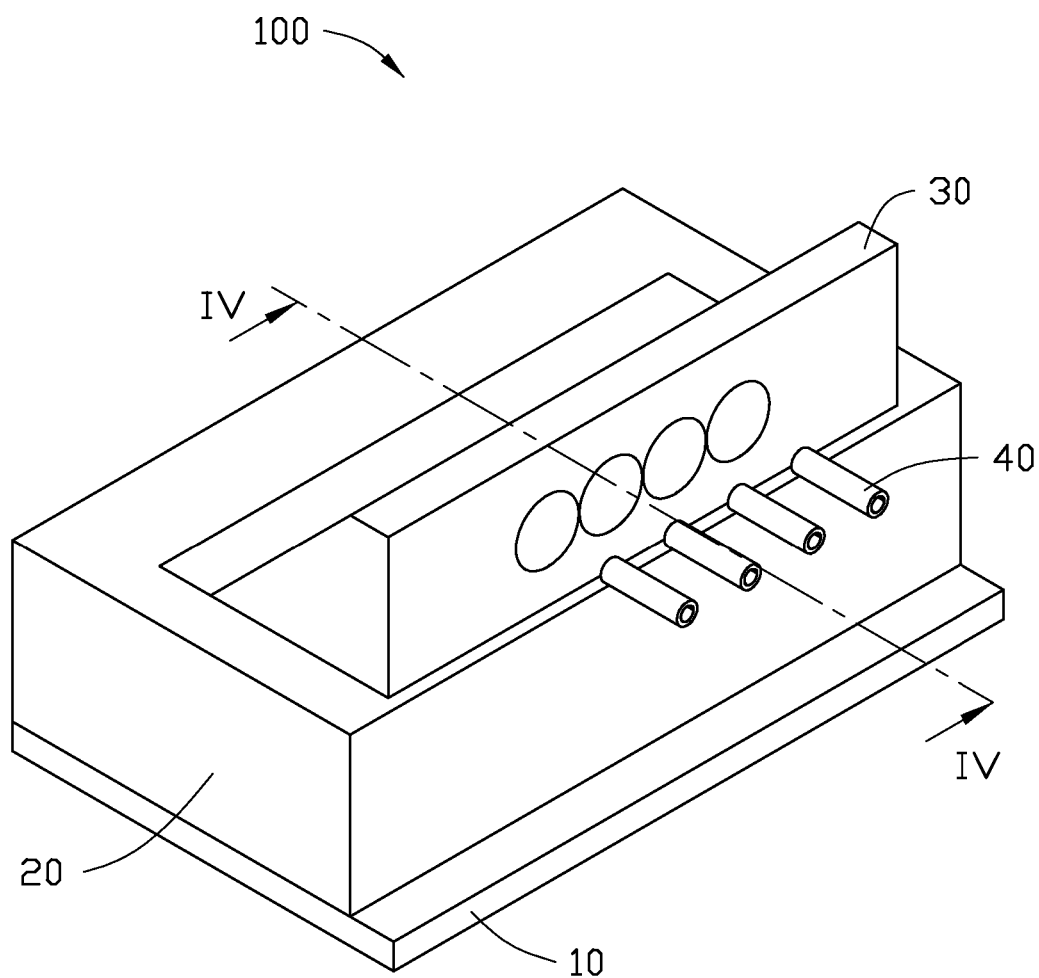
FIG. 1 is an isometric view of an embodiment of an optical communication apparatus.
Figure 2:
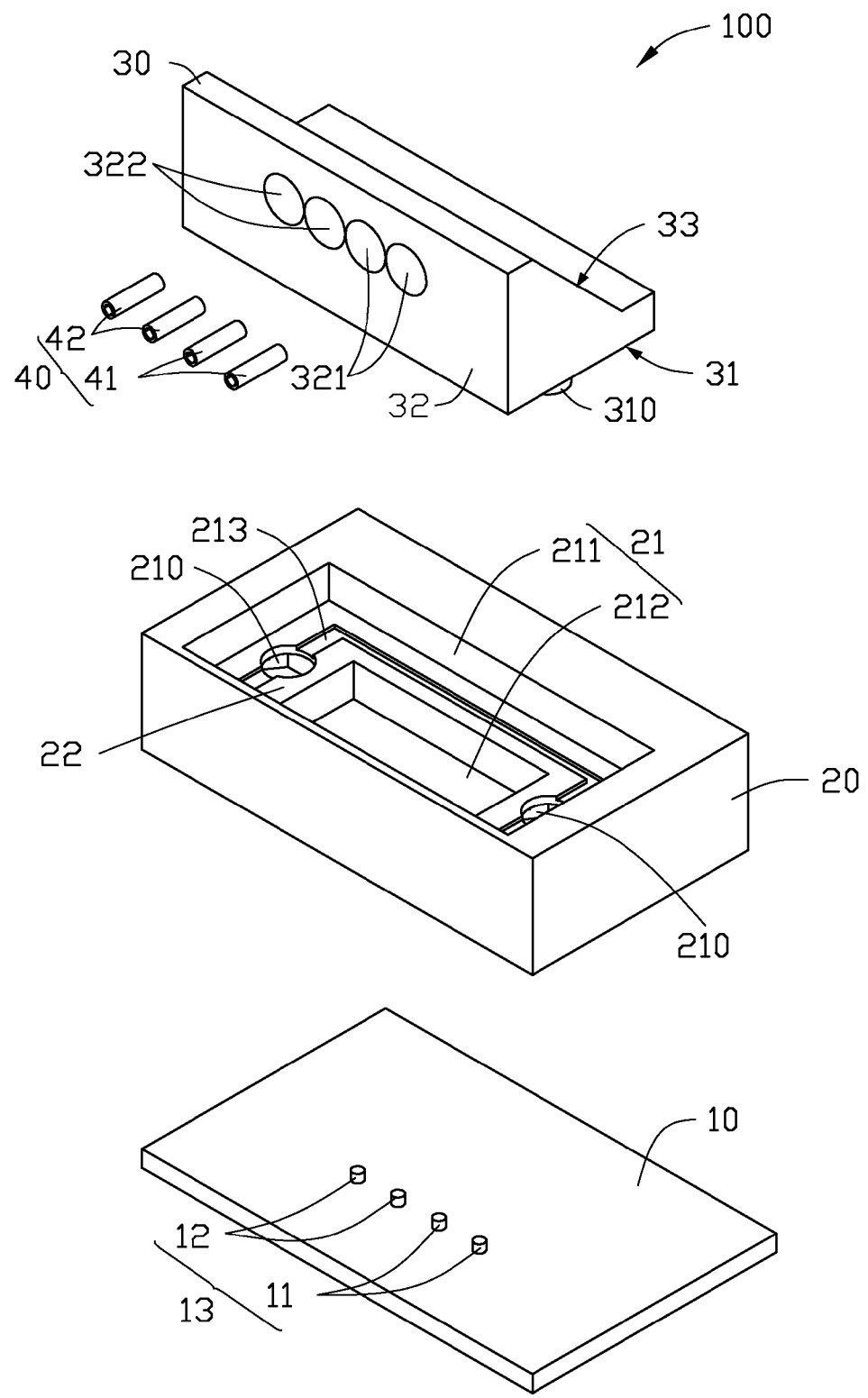
FIG. 2 is an exploded isometric view of the optical communication apparatus of FIG. 1.
Figure 3:
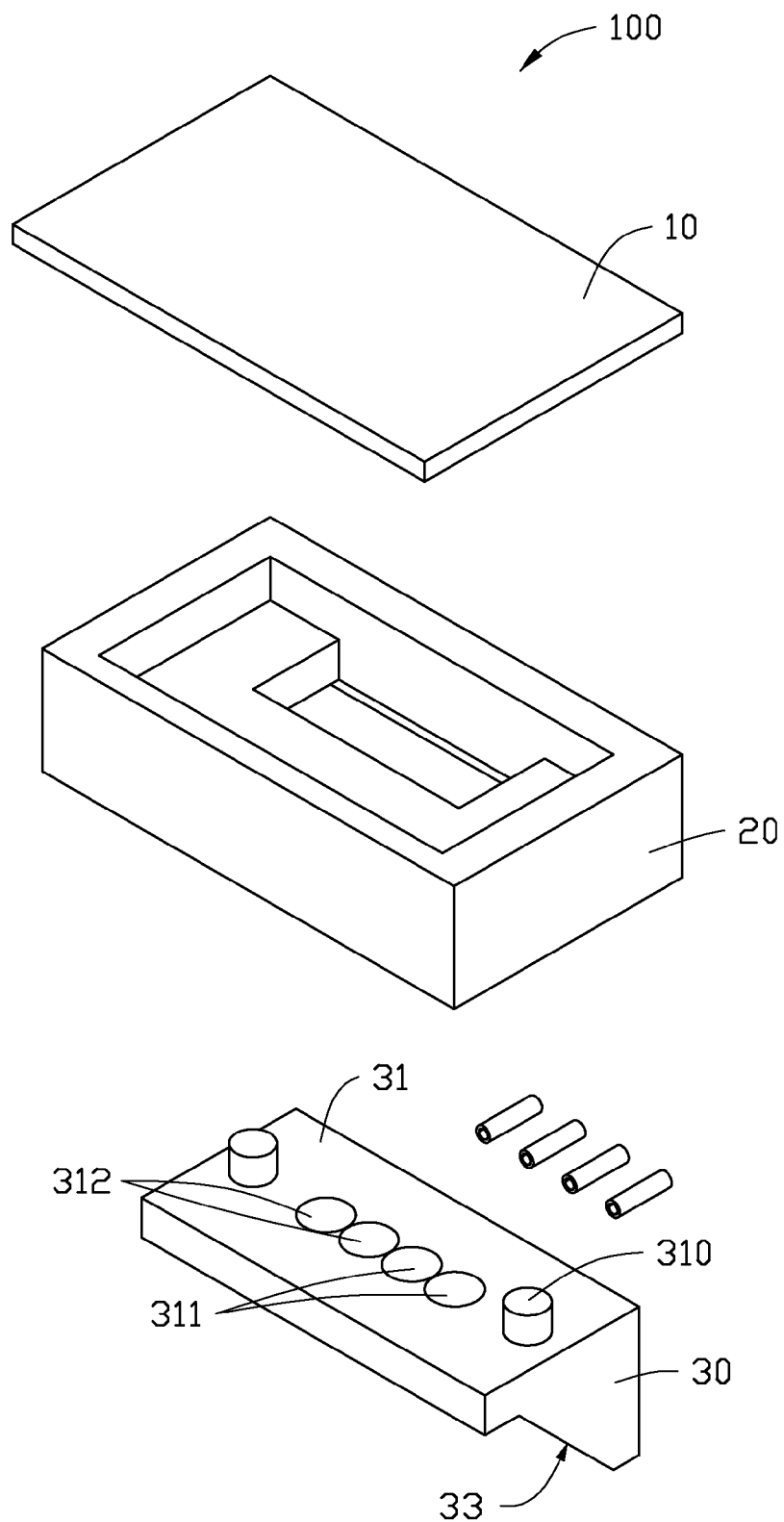
FIG. 3 is similar to FIG. 2, but shown from another angle.
Figure 4:
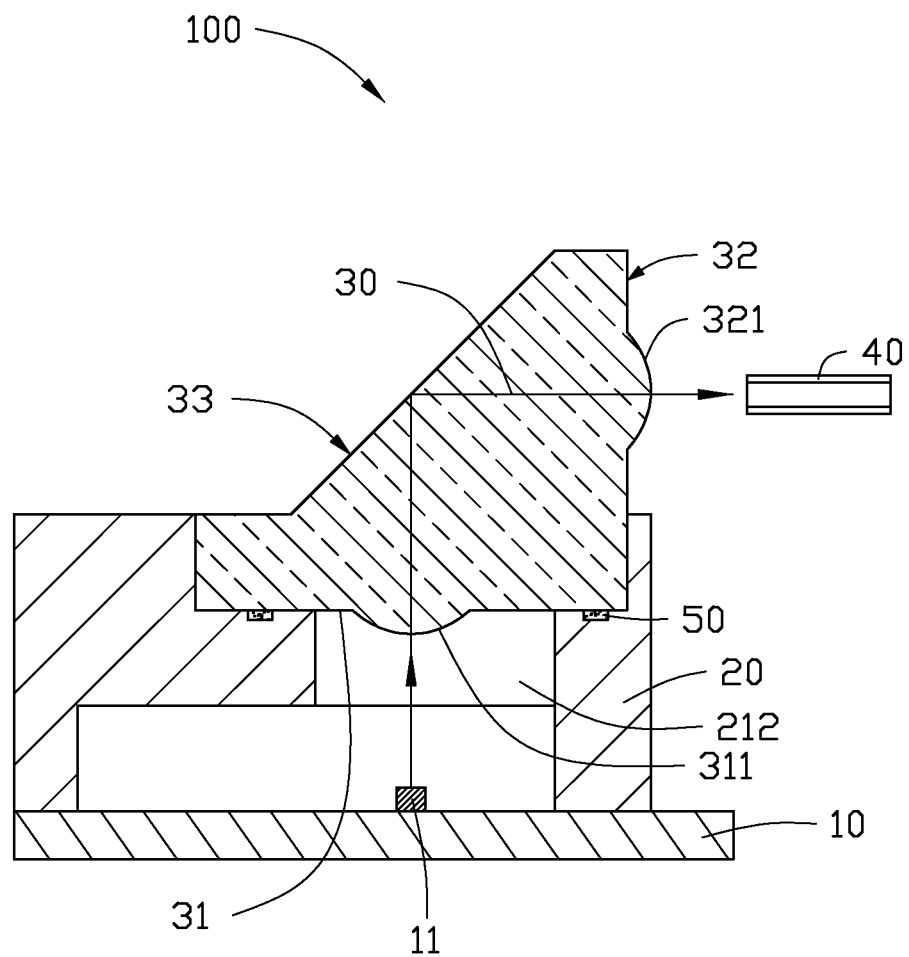
FIG. 4 is a cross-sectional view of the optical communication apparatus of FIG. 1, taken along line IV-IV.

FIGS. 1-4 show one embodiment of an optical communication apparatus 100. The optical communication apparatus 100 includes a printed circuit board (PCB) 10, a photoelectric unit 13, a supporting member 20, a coupler 30, and an optical fiber unit 40. The photoelectric unit 13 and the supporting member 20 can be located on the PCB 10, and the coupler 30 is connected to the supporting member 20 and optically coupled with the photoelectric unit 13.

The PCB 10 can be a flexible PCB (FPCB), a rigid PCB, a rigid-flex compound PCB, or other suitable PCB.

In the illustrated embodiment, the photoelectric unit 13 includes two emitters 11 for emitting optical signals, and two receivers 12 for receiving optical signals. The emitters 11 and the receivers 12 are electrically connected to the PCB 10. In this embodiment, the emitters 11 can be light emitting diodes (LEDs) or laser diodes, and the receivers 12 can be photodiodes. In this embodiment, the emitters 11 and the receivers 12 are arranged in a line.

The supporting member 20 is substantially rectangular. The supporting member 20 defines a stepped hole 21. The stepped hole 21 includes a first hole 211 and a second hole 212 communicating with the first hole 211. A size of the first hole 211 is larger than a size of the second hole 212. The supporting member 20 forms a step portion 22 between the first hole 211 and the second hole 212. The supporting member 20 defines two positioning holes 210 and a groove 213 in a surface of the step portion 22. In this embodiment, the groove 213 is coupled to the positioning holes 210. The groove 213 is configured for receiving an adhesive 50 (seen in FIG. 4) therein. In this embodiment, the groove 213 extends all around the second hole 213.

The coupler 30 is made of transparent material. The coupler 30 includes a first surface 31 facing the supporting member 20, a second surface 32, and a third surface 33. The first surface 31 is substantially perpendicular to the second surface 32.

An angle between the first surface 31 and the third surface 33 is substantially 45 degrees, and an angle between the second surface 32 and the third surface 33 is substantially 45 degrees.

The coupler 30 includes two positioning poles 310 corresponding to the positioning holes 210, two first lenses 311 corresponding to the emitters 11, and two second lenses 312 corresponding to the receivers 12. The positioning poles 310 and the first and second lenses 311, 312 are formed on the first surface 31. Each positioning pole 310 has a shape and size corresponding to the corresponding positioning hole 210. In one embodiment, the first lenses 311 and the second lenses 312 are convex lenses. An optical axis of each of the first and second lenses 311, 312 is substantially perpendicular to the first surface 31.

The coupler 32 includes two third lenses 321 corresponding to the first lenses 311, and two fourth lenses 322 corresponding to the second lenses 312. The third and fourth lenses 321, 322 are formed on the second surface 32. An optical axis of each of the third and fourth lenses 321, 322 is substantially perpendicular to the second surface 32.

The optical fiber unit 40 includes two output optical fibers 41 corresponding to the emitters 11, and two input optical fibers 42 corresponding to the receivers 12. The output optical fibers 41 output optical signals emitted by the emitters 11, and the input optical fibers 42 input optical signals to the receivers 12.

In assembly, the photoelectric unit 13 is electrically connected to the PCB 10. The supporting member 20 is fixedly positioned on the PCB 10, such that the second hole 212 is closer to the PCB 10 than the first hole 211, and the photoelectric unit 13 is exposed through the stepped hole 21. An adhesive 50 is filled in the groove 213. The first surface 31 of the coupler 30 is received into the first hole 211, such that the positioning poles 310 are received into the corresponding positioning holes 210, and the first surface 31 is supported on the step portion 22. The adhesive 50 adheres the coupler 30 to the step portion 22. The first lenses 311 are aligned with the corresponding emitters 11, and the second lenses 312 are aligned with the corresponding receivers 12. The output optical fibers 41 are aligned with the corresponding third lenses 321, and the input optical fibers 42 are aligned with the corresponding fourth lenses 322.

In use, the emitters 11 emit optical signals to the coupler 20. The optical signals pass through the first lenses 311 and project onto the third surface 33. The third surface 33 reflects the optical signals to the third lenses 321. The optical signals pass out of the coupler 20 through the third lenses 321 and enter into the output optical fibers 40. It is understood that optical signals transmitted from the input optical fibers 42 can be received by the receivers 12 by passing along the same path as the optical signals emitted from the emitters 11, but in the opposite direction.

In this embodiment, the positioning poles 310 are formed on the coupler 30, and the positioning holes 210 are defined in the supporting member 20.

Alternatively, the coupler 30 may define a number of positioning holes, and the supporting member 20 may include a number of positioning poles.

It is understood that numbers of the emitters 11, the receivers 12, and the corresponding optical fibers 41, 42 can be changed according to different requirements, and numbers of the first lenses 311, the second lenses 312, the third lenses 321, and the fourth lenses 322 can be changed accordingly.

The coupler 30 and the supporting member 20 are connected to each other via engagement between the positioning holes 3210 and the positioning poles 310, thus aligning the first lenses 311 and the second lenses 312 with the emitters 11 and the receivers 12, respectively. Therefore, easy and precise assembly of the coupler 30 to the photoelectric unit 13 is ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication apparatus, comprising:
   a printed circuit board (PCB);
   a photoelectric unit electrically connected to the PCB;
   a supporting member fixedly positioned on the PCB, the supporting member defining a plurality of through holes, the plurality of through holes comprising a larger first hole and a smaller second hole, the supporting member comprising a step portion formed at a boundary between the first hole and the second hole, the second hole being closer to the PCB than the first hole, the step portion surrounding the second hole, and the photoelectric unit being exposed in the stepped hole;
   a coupler engaged into the first hole and supported on the step portion; and
   an optical fiber unit, the optical fiber unit and the photoelectrical unit being optically coupled to each other by the coupler;
   wherein one of the step portion of the supporting member or the coupler defines a plurality of positioning holes, the other of the step portion of the supporting member or the coupler comprises a plurality of positioning poles corresponding to the positioning holes, the coupler is connected to the step portion of the supporting member by inserting the positioning poles into the corresponding positioning holes.

2. The optical communication apparatus of claim 1, wherein the photoelectric unit comprises a plurality of emitters for emitting optical signals and a plurality of receivers for receiving optical signals.

3. The optical communication apparatus of claim 2, wherein the emitters and the receivers are arranged along a linear direction.

4. The optical communication apparatus of claim 2, wherein the emitters are laser diodes, and the receivers are a photodiodes.

5. The optical communication apparatus of claim 2, wherein the coupler comprises a first surface facing toward the PCB, a second surface, and a third surface, the third surface is configured for reflecting optical signals between the first surface and the second surface.

6. The optical communication apparatus of claim 2, wherein the coupler comprises a plurality of first lenses corresponding to the emitters and a plurality of second lenses corresponding to the receivers, the first lenses and the second lenses are formed on the first surface.

7. The optical communication apparatus of claim 6, wherein an optical axis of each of the first lenses and the second lenses is substantially perpendicular to the first surface.

8. The optical communication apparatus of claim 6, wherein the coupler comprises a plurality of third lenses corresponding to the first lenses and a plurality of fourth lenses corresponding to the second lenses, the third lenses and the fourth lenses are formed on the second surface.

9. The optical communication apparatus of claim 8, wherein an optical axis of the each of the third lenses and fourth lenses is substantially perpendicular to the second surface.

10. The optical communication apparatus of claim 1, wherein the PCB is selected from one of a group consisting of a flexible PCB, a rigid PCB, and a rigid-flex compound PCB.

11. The optical communication apparatus of claim 1, wherein the positioning holes are defined in a surface of the step portion, and the positioning poles are formed on a surface of the coupler facing toward the PCB.

12. The optical communication apparatus of claim 1, wherein the supporting member defines a groove in the step portion, the groove is configured for receiving an adhesive for adhering the coupler to supporting member.

13. The optical communication apparatus of claim 12, wherein the groove extends all around the second hole.

* * * * *